US008224693B2

(12) United States Patent
Lukose et al.

(10) Patent No.: US 8,224,693 B2
(45) Date of Patent: Jul. 17, 2012

(54) ADVERTISEMENT SELECTION BASED ON KEY WORDS

(75) Inventors: Rajan Lukose, Oakland, CA (US); Martin B. Scholz, San Francisco, CA (US); Shyam S. Rajaram, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 259 days.

(21) Appl. No.: 12/465,947

(22) Filed: May 14, 2009

(65) Prior Publication Data

US 2010/0293062 A1 Nov. 18, 2010

(51) Int. Cl.
*G06Q 30/00* (2006.01)
(52) U.S. Cl. ...................................................... 705/14.1
(58) Field of Classification Search .................. 705/14.1
See application file for complete search history.

(56) References Cited

U.S. PATENT DOCUMENTS

| | | |
|---|---|---|
| 6,839,680 B1 | 1/2005 | Liu et al. |
| 2003/0101449 A1 | 5/2003 | Bentolila et al. |
| 2004/0017930 A1 | 1/2004 | Kim et al. |
| 2004/0111453 A1 | 6/2004 | Harris et al. |
| 2005/0049985 A1 | 3/2005 | Mangasarian et al. |
| 2005/0180627 A1 | 8/2005 | Yang et al. |
| 2007/0122009 A1 | 5/2007 | Jee et al. |
| 2007/0198506 A1* | 8/2007 | Attaran Rezaei et al. ........ 707/5 |
| 2008/0025568 A1 | 1/2008 | Han et al. |
| 2008/0126176 A1 | 5/2008 | Iguchi |
| 2008/0177478 A1 | 7/2008 | Hlavacek et al. |
| 2008/0183646 A1 | 7/2008 | Harris et al. |

OTHER PUBLICATIONS

Fenstermacher et al.; "Mining Client-Side Activity for Personalization" Department of Management Information Systems, Eller College of Business and Public Administration, University of Arizona, Jun. 2002.
Baoyao, Zhou; "Intelligent Web Usage Mining" Nanyang Technological University, Division of Information Systems, School of Computer Engineering, 2004.
Baynote Inc.: The Collective Intelligence Platform, Online, http://www.baynote.com/technology/platform/ 2010.
Hottolink Inc.; "Recognize" Online, http://www.hottolink.co.jp/english/reconize.html, 2009.
Andrejko et al.: "User Characteristics Acquisition from Logs with Semantics" 8. Slovak University of Technology in Bratislava.
Hongjun Lu et al: "Extending a Web Browser with Client-Side Mining," Hong Kong University of Science and Technology Department of Computer Science, Clear Water Bay, Kowloon, Hong Kong, China, 2003.
Shankar et al.; "Personalized Web Search Based on Client Side Ontology", CS 498: B.Tech Project, 10. IIT Kanpur, India 2010.
Sendhikumar et al.; "Personalized ontology for web search personalization" 1. Anna University, Chennai, India, 2008.
Shahabi et al.; "Yoda An Accurate and Scalable Web based Recommendation System?" University of Southern California, Los Angeles, Sep. 2001.
WHY WUBAT? Website User Behavior & Analysis Tool, Wubat, Online, http://www.wubat.com/.
Claypook et al.; "Implicit Interest Indicators", 14. Worcester Polytechnic Institute, Worcester, Computer Science Department Worcester Polytechnic Institute Worcester, MA 01609, USA., 2001.

(Continued)

*Primary Examiner* — Daniel Lastra

(57) ABSTRACT

A computer-implemented method comprises running, by a processor, a plurality of classifiers on a web page to obtain one or more keywords. The method further comprises selecting, by the processor, advertisements based on the one or more keywords.

20 Claims, 4 Drawing Sheets

OTHER PUBLICATIONS

Shahabi et al.; "A Framework for Efficient and Anonymous Web Usage Mining Based on Client-Side Tracking", 15. University of Southern California, Los Angeles, 2002.

Chattertrap; Online http://www.chattertrap.com; Jul. 20, 2010.

HSNW: SRI defense technology spawns civilian application: published Jun. 29, 2010.

Anthony Ha: Facebook invester backs Chattertrap, a personal assistant for content, Jun. 28, 2010.

* cited by examiner

US 8,224,693 B2

ADVERTISEMENT SELECTION BASED ON KEY WORDS

BACKGROUND

A goal of on-line advertising is to choose advertisements ("ads") appropriate for the target audience. Automatically choosing ads that are relevant to the content of the web pages is difficult.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
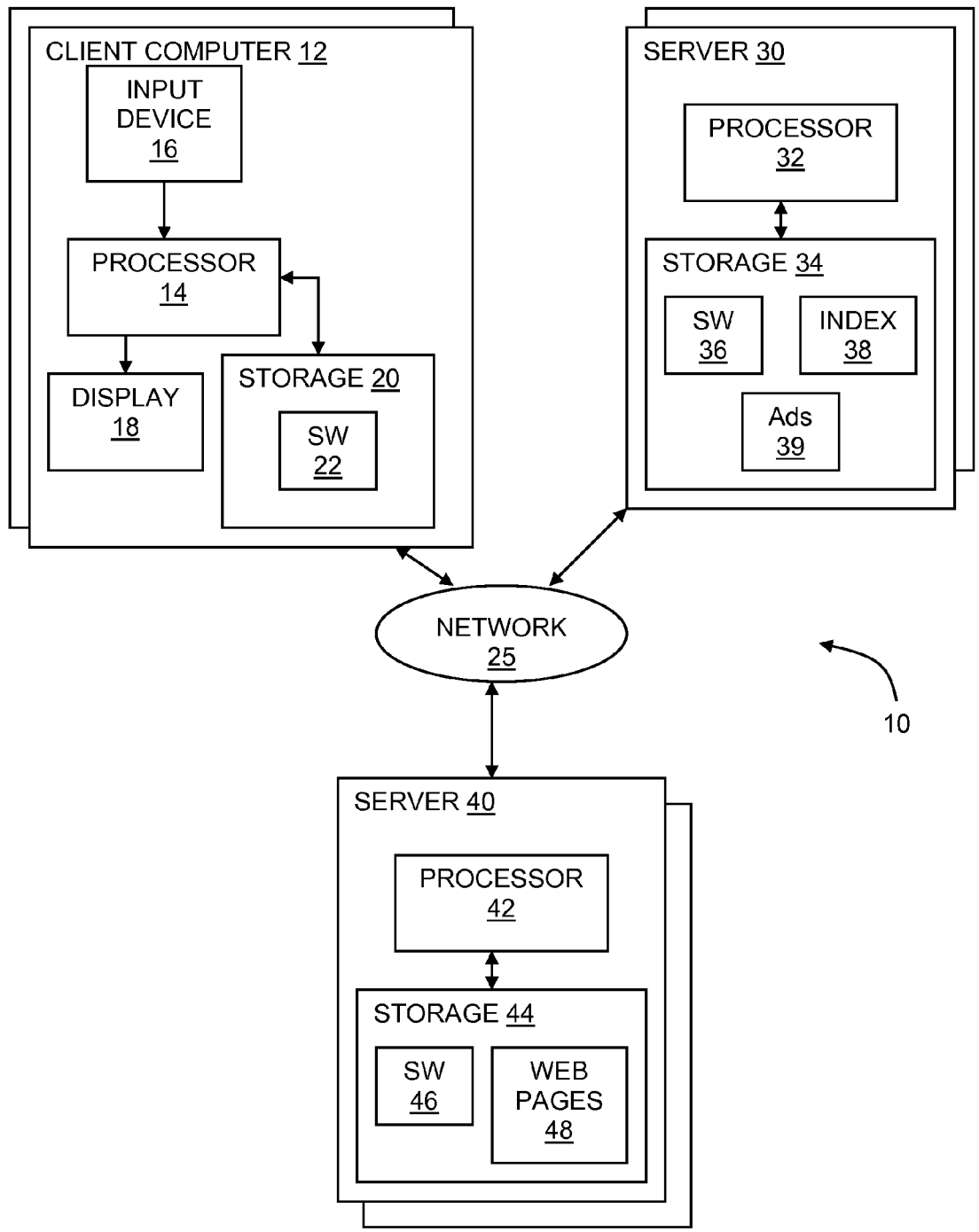
FIG. 1 shows a system in accordance with various embodiments.

FIG. 1 shows a system 10 comprising one or more client computers 12 coupled via a network 25 to one or more servers 30 and one or more servers 40. The network 25 may comprise a local area network (LAN), wide area network (WAN) such as the Internet, or combinations thereof.

Each client computer 12 may be a portable computer (e.g., notebook computer, handheld computer, etc.) or a desktop computer. Each client computer 12 may comprise a processor 14 coupled to an input device 16, a display 18, and a storage 20. The input device 16 may comprise one or more of a keyboard, mouse, trackball, touchpad, etc. The display may comprise any suitable display such as liquid crystal display (LCD). The storage 20 may comprise volatile memory (e.g., random access memory, "RAM"), non-volatile storage (e.g., Flash storage, read only memory, hard disk drive, compact disc read only memory, etc.) or combinations thereof. The storage 20 contains software 22 that, when executed by processor 14, causes the processor 14 to perform one or more all of the functions described herein that are attributable to the client computer 12. The software may be or include a browser that enables the user to navigate the world wide web.

Each server 30 comprises a processor 32 coupled to storage 34. The storage 34 may comprise volatile memory (e.g., RAM), non-volatile storage (e.g., Flash storage, read only memory, hard disk drive, compact disc read only memory, etc.) or combinations thereof. The storage 34 contains software 36 that, when executed by processor 32, causes the processor 32 to perform one or more all of the functions described herein that are attributable to the server 30. The storage also contains an index 38 that maps search keywords to ads. In at least some embodiments, each server 30 provides an on-line search engine function to enable users of client computers 12 to perform a search using software 22.

Each server 40 comprises a processor 42 coupled to storage 44. The storage 44 may comprise volatile memory (e.g., RAM), non-volatile storage (e.g., Flash storage, read only memory, hard disk drive, compact disc read only memory, etc.) or combinations thereof. The storage 44 contains software 46 that, when executed by processor 42, causes the processor 42 to perform one or more all of the functions described herein that are attributable to the server 40. The storage also contains one or more web page 48 that are accessible to the user of client computer 12. In at least some embodiments, each server 40 functions as a web page server to respond to requests from client computer 12 for particular web pages and transmit those web pages over network 25 to the client computer 12.

Figure 2:
FIG. 2 graphically illustrates that web pages are mapped to search keywords which are then mapped to advertisements in accordance with various embodiments.

In accordance with various embodiments, a user of a client computer 12 accesses web pages 48 hosted on one or more of the servers 40 and server computers 30 provide targeted advertisements for inclusion with such web pages. This disclosure provides an illustrative technique for how ads are mapped to specific web pages. In at least some embodiments, the technique includes determining a classifier for each of a plurality of keyword search terms and then using those classifiers to determine which keyword(s) are mostly closely related to a web page the user desires to view. Once the relevant keywords are determined, then advertisements associated with those specific keywords are selected for inclusion with the web page. FIG. 2 illustrates the relationship between web pages, search key words and ads. Web pages are mapped to specific key words using the classifiers, and then the search key words are mapped to specific advertisements.

Figure 3:
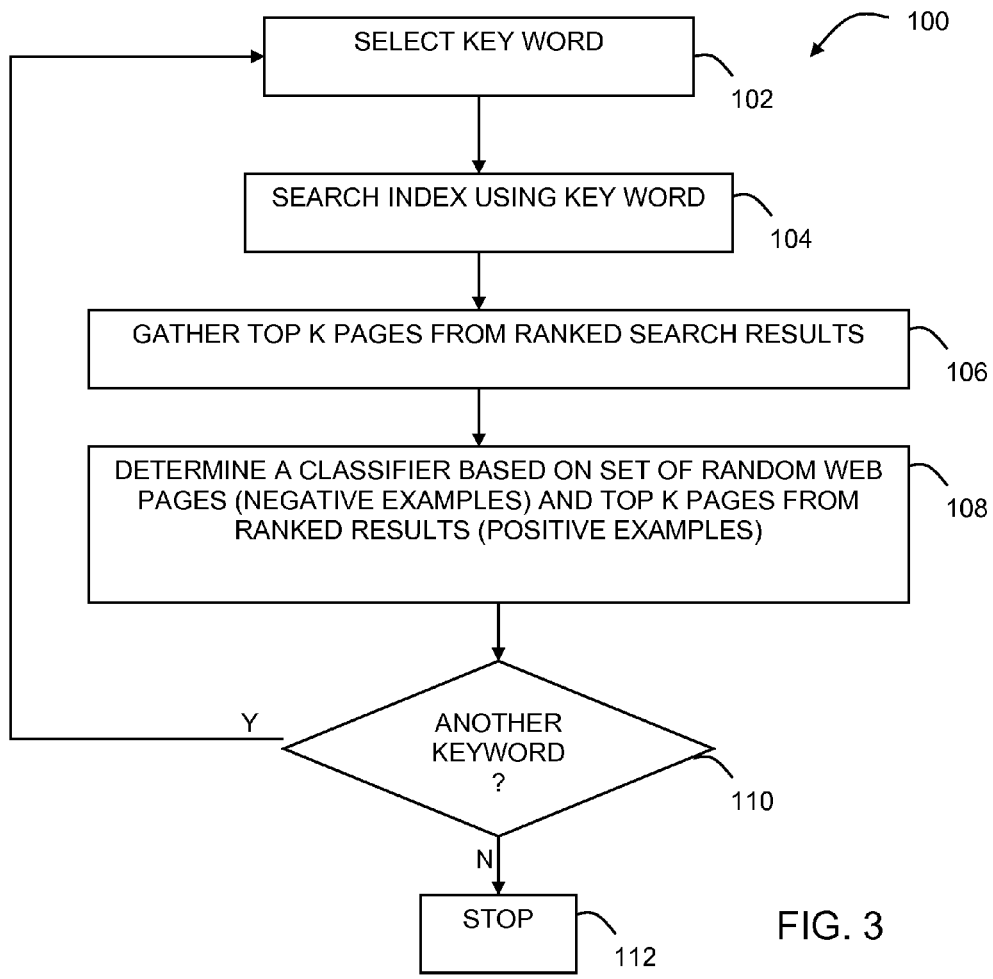
FIG. 3 shows a method in accordance with various embodiments for generating classifiers for search keywords.

FIG. 3 provides an illustrative method 100 for determining the classifiers. This method is performed on a computer executing a software application. In some embodiments, one or more of the servers 30 perform the method 100, but in general, any computer can perform method 100 and/or any organization (search engine company or other) can cause method 100 to be performed. Each step of method 100 is performed by a processor (e.g., processor 32) executing instructions from a software application (e.g., software 36).

At 102, a search key word is selected. A search key word is a term from index 38 that a user can enter into a search engine For example, if a user is searching for information an automobile insurance, the user might enter the search key word "automobile insurance" into a search engine accessible via the user's software 22. The search engine responds to the user's request with a list of web pages that potentially are relevant to the user's key word. The index 38 contains a list of multiple search key words (e.g., 10,000). At 102, one of those search key words is selected. Steps 104-108 are then performed on the selected search key word. If an additional search key word exists in the index, as determined at 110, then another search key word is selected (step 102 again) and the process repeats. Method 100 may continue until all search key words in the index 38 are processed or until a stop criteria (e.g., only perform method 100 for a predetermined number, such as 5000, search key words) is reached that results in less than all search key words being processed. The process thus ends at 112.

At 104, the selected search key word is used to search the index 38 in the same or similar way that a user would enter the search key word into the search engine's search field. From the index 38, a list of potential matches of web pages to the selected search key word is obtained. Some of these web pages may be very relevant to the search key word, while other web pages may be less relevant or generally unrelated (but happen to mention the search key word). The index ranks the web page results in terms of relevance to the search key word, similar to how a search engine would report search results back to a user of browser that accesses that search engine.

At 106, the top K web pages from the ranked search results are gathered. In some embodiments, K is a predetermined value that can be any desired value. For example, K could be 10 and in step 106, the top 10 pages are gathered from the ranked search results. Gathering the top K web pages from the ranked results comprises, for example, storing the uniform resource locator (URL) or Internet Protocol (IP) address for those particular web pages.

At 108, method 100 comprises determining a classifier based on a set of randomly selected web pages as well as the top K web pages from the ranked search results. The top K ranked search results represent "positive" examples of the relationship between the selected search key word and the K web pages. That is, the relevance between the search key word and the top K web pages is higher than for other web pages. To a user this means that top K web pages are highly relevant to the selected search key word. The set of randomly selected web pages are considered "negative" examples meaning that the relevance of those web pages to the selected search key word is relatively low and certainly lower than for the top K web pages. Accordingly, a classifier is determined based on inputs that are highly relevant to the key word and other inputs that are generally irrelevant to the key word.

The set of randomly selected web pages are obtained, for example, from a library of web pages. A random number generator function may used to select web pages for inclusion in the set of randomly selected web pages. The web pages may be randomly selected or pseudo-randomly selected. The large set of randomly selected web pages will be much less related to the search key word than the top K web pages from the ranked search results. In accordance with various embodiments, the set of randomly selected web pages is larger than the top K web pages from the ranked search results. For example, the set of randomly selected web pages may be 100,000 web pages.

The classifier so determined for that particular search key word comprises a function that can be used to "score" a given web page. That is, the classifier will compute a score for a given web page. The score indicates how relevant the input web page is to the keyword associated with that classifier (i.e., the keyword on which the classifier was determined in the first place). Any of a variety of techniques can be implemented to determine the classifier. In accordance with at least embodiments, the Support Vector machine (SVM) classifier technique is used. The SVM is described in U.S. Pat. Pub. No. 20050049985, incorporated herein by reference.

In some embodiments, constructing the classifier involves extracting the relevant part from each website and translating each document into a higher order dimensional vector. Each dimension corresponds to a different term, and the component of each vector specifies how often the term occurs in the document. The dimensionality of the vector might be in the range between 10,000 and a few million. Most document vectors will be 0 for almost all dimensions, only non-zero components will be stored. The terms can be taken directly from the relevant parts of the website after breaking the string down into words after each whitespace (referred to as "tokenizing"). Suitable refinements are stemming ("ad" and "ads" would be considered the same), eliminating unusual characters, and so on. The data in this representation is the input to the learning step. Other steps may include normalizing each vector to a common L2-norm of 1, selecting terms that are predictive of the class label in some sense (e.g., using the "information gain" technique), normalizing each dimension to a common range of [0,1] or to mean 0, a standard deviation of 1, etc. After ending up with the final input data set, a classifier is trained using a suitable technique. Linear SVMs can be used in this context, as well as NaïveBayes, κ-nearest neighbors, and various other techniques.

Figure 4:
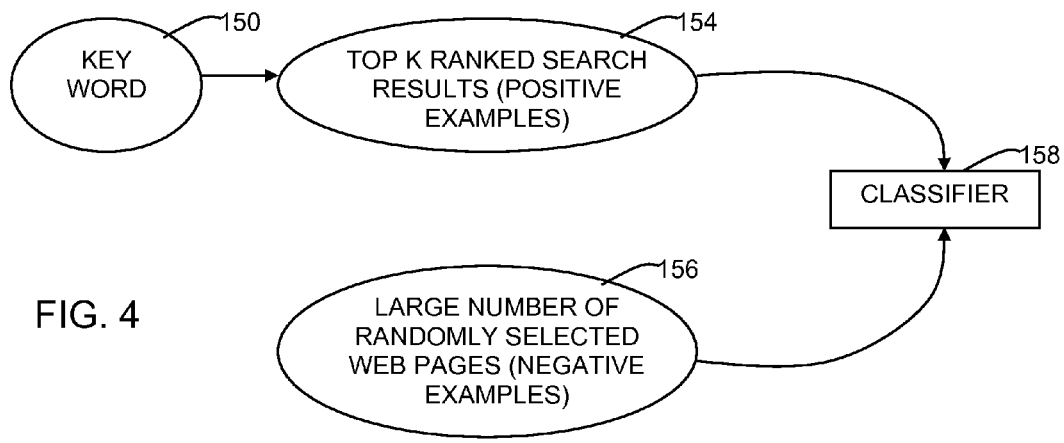
FIG. 4 graphically illustrates how a classifier is generated based on positive and negative examples in accordance with various embodiments.

FIG. 4 conceptually illustrates the determination of a classifier to be associated with a given key word. For a given selected search key word 150, the top K ranked search results 154 are determined. A large number (e.g., 100,000) of randomly selected web pages 156 are also obtained. Both the K ranked search results 154 and the randomly selected web pages 156 are used to determine a classifier 158.

Figure 5:
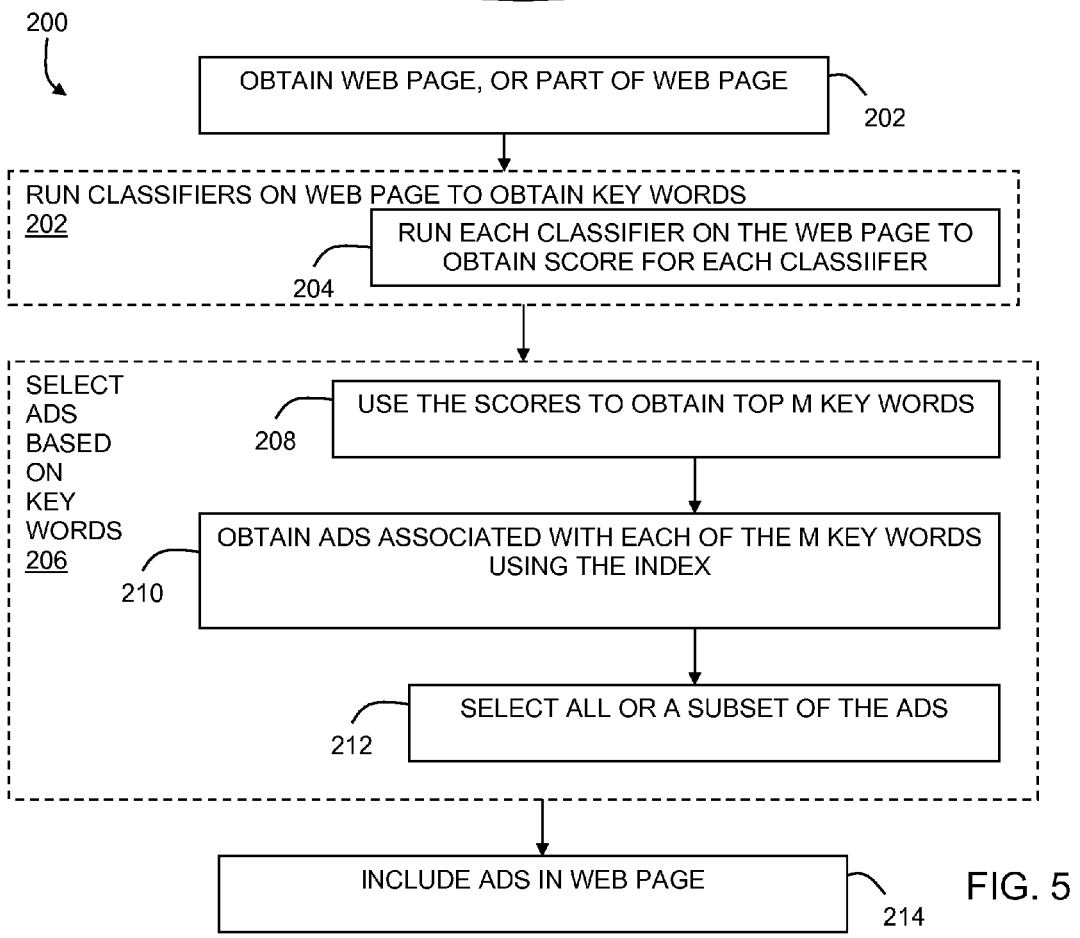
FIG. 5 shows a method of using the classifiers to obtain keywords usable to select advertisements in accordance with various embodiments.

FIG. 5 illustrates a method 200 for associating one or more targeted ads with a given web page. For purpose of method 200, the classifiers for the search key word have already been determined and are available to use. Method 200 is performed on a computer executing a software application. In some embodiments, one or more of the servers 30 perform the method 100, but in general, any computer can perform method 200 and/or any organization (search engine company or other) can cause method 200 to be performed. In some embodiments, the user wishes to view a particular web page (either discovered via a search engine or accessed directly by the user via the target web page's URL). The person or company that hosts that particular web page may have an agreement in place for ads to be included within or otherwise linked to the web page from a third party advertisement entity which could be, for example, an owner/operator of a server 30. Each step of method 200 is performed by a processor (e.g., processor 32) executing instructions from a software application (e.g., software 36).

At 202, the user selects a desired web page via his or her browser (software 22). While the web page is obtained by server 40 and being provided to the user of client computer 12, steps 202-214 are performed. At 202, the method 200 comprises each of the previously determined classifiers being run on the selected web page to obtain key words. In various embodiments, the key words so obtained are key words determined to be relevant to the selected web page. For example, if the web page is by an automobile insurance company, the key words obtained in step 202 may include "automobile insurance" and "automobile repair." At least one way to implement step 202 is identifier at 204 to run each classifier on the web page to obtain a score for each classifier. A higher score for a given classifier indicates that the search key word associated with that classifier may be more closely related to the selected web page than for a classifier that computes a lower score.

At 206, method 200 comprises selecting ads based the key words obtained from step 202. At least one embodiment of step 206 comprises steps 208, 210, and 212. Step 208 comprises using the classifier scores to obtain the top M key words, where may the same or different from K. M may be, for example, 2. As such, the key words with the top 2 scores from among all of the classifiers are selected. At 210, the method comprises obtaining advertisements associated with each of the top M key words using the index 38 (the index maps key words to ads). At 216, the method comprises selecting all or a subset of the ads obtained using the index 38. The number of ads selected can be fixed or programmable and can vary from web page to web page. For example, a particular company hosting a web page may only 10 ads to show up on its web page, while another web page host might want 15 ads to appear on its web page.

If a subset of the ads pertaining to the winning search key words are desired, the subset of ads may be selected in accordance one or more of various criteria. For example, the ads may be selected based on relevance, randomly, or by an ad revenue, influenced procedure. Such a procedure may be to choose ads based on "clickthrough" data, price, and/or on the unused balance of the ad buyer.

At 214, the selected ads are included with the web page. This action may include including the ad itself in the web page or including a hyperlink to the selected ads.

Figure 6:
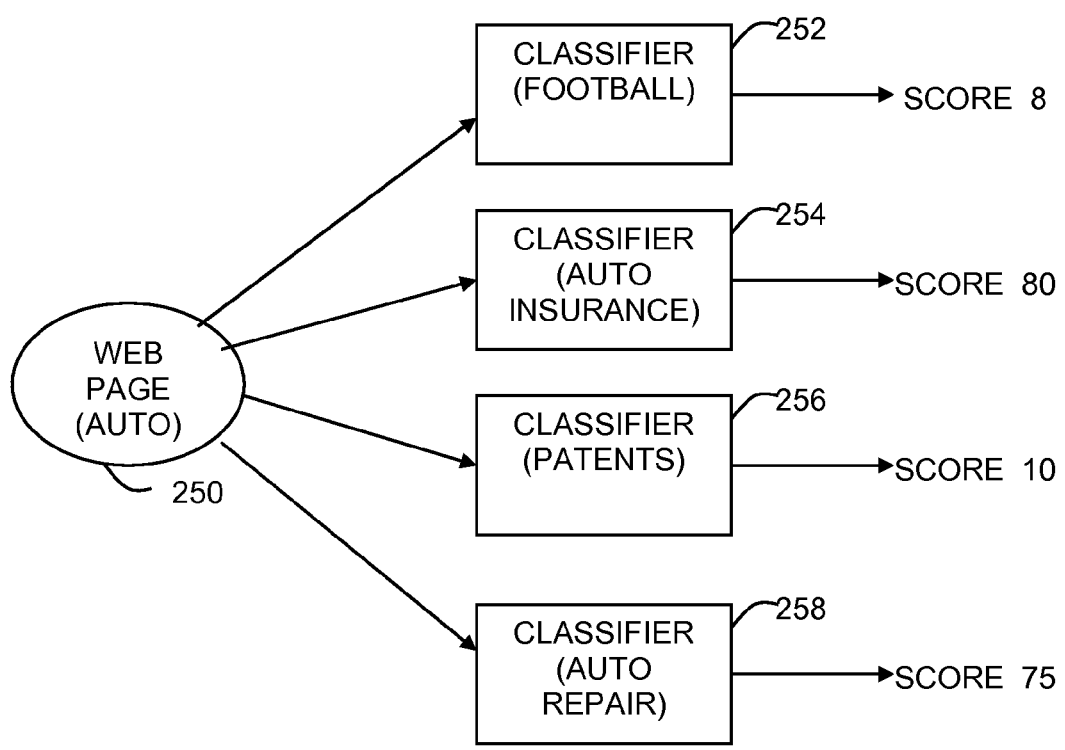
FIG. 6 graphically illustrates a web page being run through multiple classifiers to obtain scores that are usable to obtain keywords in accordance with various embodiments.

FIG. 6 illustrates how a web page is run through the various classifiers to obtain classifier scores. A web page 250 is provided to each of the classifiers 252, 254, 256, and 258. Each classifier 252-258 is associate with a particular search key word. For exampled, classifier 252 is associate with the key word "football." Classifiers 254, 256, and 258 are associated with the keywords "auto insurance," "patents," and "auto repair," respectively. Each classifier results in a particular score that is a metric of the correlation between the web page and the search key word associated with each such classifier. If the web page 250 is from an automobile manufacturer, then in this example, the scores for the auto insurance classifier 254 and the auto repair classifier 258 will be higher (80 and 75, respectively) than the scores for the football and patents classifiers 252 and 256 whose scores are 8 and 10, respectively. Thus, if M from step 208 in FIG. 5 is set at a value of 2, then the search key words for the top 2 classifiers with the highest scores are selected for obtaining ads. Accordingly, with scores of 80 and 75, the search key words of auto insurance and auto repair will be selected in this example. Advertisements associated with the auto insurance and auto repair search keywords then will be selected.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer-implemented method, comprising:
    running, by a processor, a plurality of classifiers on a web page to obtain one or more keywords, each classifier being previously determined based on positive and negative training examples; and
    selecting, by the processor, advertisements based on said one or more keywords.

2. The computer-implemented method of claim 1 wherein running the plurality of classifiers on said web page comprises applying each of a plurality of classifiers to the web page to generate a plurality of scores, one score for each classifier.

3. The computer-implemented method of claim 2 wherein selecting the advertisements comprises using the scores to select a top predetermined number of keywords, wherein each keyword is associated with a classifier.

4. The computer-implemented method of claim 3 wherein selecting the advertisements further comprises obtaining advertisements associated with the selected top predetermined number of keywords.

5. The computer-implemented method of claim 1 further comprising including the advertisements with the web page.

6. The computer-implemented method of claim 1 further comprising determining a classifier for each a plurality of keywords.

7. The computer-implemented method of claim 6 wherein determining a classifier for each keyword comprises searching a keyword index using said keyword to generate ranked web page search results and selecting a top predetermined number of web pages from the ranked web page search results.

8. The computer-implemented method of claim 7 further comprising generating a classifier for said keyword based on said top predetermined number of web pages from the ranked web page search results and based on a plurality of randomly selected other web pages.

9. A system, comprising:
    a processor; and
    storage coupled to said processor and containing software that, when executed by the processor, causes the processor to run a plurality of classifiers on a web page to obtain one or more keywords and to select advertisements based on said one or more keywords, each classifier being previously determined based on positive and negative training examples.

10. The system of claim 9 wherein said processor runs the plurality of classifiers on said web page by applying each of a plurality of classifiers to the web page to generate a plurality of scores, one score for each classifier.

11. The system of claim 10 wherein the processor selects the advertisements by using the scores to select a top predetermined number of keywords, wherein each keyword is associated with a classifier.

12. The system of claim 11 wherein the processor selects the advertisements by obtaining advertisements associated with the selected top predetermined number of keywords.

13. The system of claim 9 wherein the processor further causes the advertisements or a link to the advertisements to be included with the web page.

14. The system of claim 9 wherein the processor also determines a classifier for each a plurality of keywords.

15. The system of claim 14 wherein the processor determines a classifier for each keyword by searching a keyword index using said keyword to generate ranked web page search results and selecting a top predetermined number of web pages from the ranked web page search results.

16. The system of claim 15 further comprising the processor generating a classifier for said keyword based on said top predetermined number of web pages from the ranked web page search results and based on a plurality of randomly selected other web pages.

17. A computer-readable storage medium containing software that, when executed by a processor, causes the processor to:

obtain a web page;

run a plurality of classifiers on said web page to obtain one or more keywords, each classifier being previously determined based on positive and negative training examples; and select advertisements based on said one or more keywords.

18. The computer-readable storage medium of claim 17 wherein the software causes the processor to run the plurality of classifiers on said web page by applying each of a plurality of classifiers to the web page to generate a plurality of scores, one score for each classifier.

19. The computer-readable storage medium of claim 18 wherein the software causes the processor to select the advertisements by using the scores to select a top predetermined number of keywords, wherein each keyword is associated with a classifier.

20. The computer-readable storage medium of claim 19 wherein the software causes the processor to select the advertisements by obtaining advertisements associated with the selected top predetermined number of keywords.

* * * * *